Jan. 25, 1949.  A. C. WALL  2,459,855
IGNITION SYSTEM AND APPARATUS THEREOF
Filed Aug. 12, 1944  4 Sheets-Sheet 1

INVENTOR.
Alexander C. Wall
BY
Watson, Bristol, Johnson & Leavenworth
ATTORNEYS

Jan. 25, 1949. A. C. WALL 2,459,855
IGNITION SYSTEM AND APPARATUS THEREOF
Filed Aug. 12, 1944 4 Sheets-Sheet 2

INVENTOR.
Alexander C. Wall
BY
Datron, Bristol, Johnson & Leavenworth
ATTORNEYS

Jan. 25, 1949.  A. C. WALL  2,459,855
IGNITION SYSTEM AND APPARATUS THEREOF
Filed Aug. 12, 1944  4 Sheets-Sheet 4

INVENTOR.
Alexander C. Wall
BY
Watson, Bristol, Johnson & Leavenworth
ATTORNEYS

Patented Jan. 25, 1949

2,459,855

UNITED STATES PATENT OFFICE 2,459,855

IGNITION SYSTEM AND APPARATUS THEREOF

Alexander C. Wall, Indianapolis, Ind., assignor to P. R. Mallory & Co., Inc., Indianapolis, Ind., a corporation of Delaware Application August 12, 1944, Serial No. 549,278

11 Claims. (Cl. 315—85)

The present invention relates to ignition systems such as those adapted for use by internal combustion engines and, more particularly, to such a system for producing fuel charge-ignition sparks of high frequency and voltage.

A general object of the present invention is the provision of such a system characterized by a source for producing pulses of electrical energy, an oscillating circuit including a spark gap and condenser to convert said pulses to a high frequency current at relatively low voltage and a transformer to convert the resulting low voltage energy to a relatively high voltage out-put for supply to a spark plug gap, and apparatus parts thereof which are simple and readily constructed, effectively moisture-proofed, efficient in operation, sturdy and long lived, interchangeable and readily replaceable and which make for a highly efficient and effectively operable system particularly suitable for airplane engines since it greatly minimizes high altitude ignition troubles of high voltage systems and assures obtainment of sparks of efficient firing strength while minimizing radiation of radio interference energy.

A more specific object of the present invention is the provision in such a system of a connecting cable readily and easily connected between a converter device including spark gap means and condenser means and a transformer spark plug including a transformer primary winding to constitute a part of a high frequency oscillating circuit, the cable having relatively high capacitance and relatively low inductance for highly efficient operation of the system.

Another object of the present invention is the provision in such a system of a transformer primary winding which has relatively low inductance, thereby satisfying the dictates of certain relatively fixed characteristics such as the size of the impulse condenser to give an effective amount of out-put energy at the highest practical low tension voltages, and a connecting cable associated therewith having an inductance which is substantially less than that of the primary winding effectively to avoid absorption thereby of an excessive amount of the condenser voltage.

An additional object of the present invention is the provision in such a system of such connecting cable wherein two conductors are arranged concentrically with the ratio of the diameters of the core and the outer concentric conductors closely approaching one, the core conductor being relatively large and the separating insulation being substantially as thin as permissible by the maximum voltage break-down characteristic; the core conductor preferably being made up of a relatively large number of very fine wire intertwined in a manner effectively to force high frequency currents to employ each fine strand practically as a separate conductor thereby utilizing the conductor material most effectively with a minimization of skin effect.

A further object of the invention is to provide in such a system an effective shielding means characterized by a shielding sheath for the two-conductor cable, which sheath is adapted to be grounded, and to which the conductor that is to serve as the grounded side of the high frequency oscillatory circuit may be connected at, for example, a single point remote from the transformer spark plug, preferably at the converter unit, effectively to reduce or minimize radio interference radiations or effects by confinement of the flow of radio frequency currents wholly or substantially entirely within the sheath; the shielding sheath also being adapted for ready connection to and cooperation with shielding casings of the transformer spark plug and converter unit for at least complete efficient shielding of all elements of the system beyond the energy supply to the oscillatory circuit.

Still another object of the invention is to provide in such a system readily separable and demountable converter, spark plug and connecting cable units which may be quickly and easily assembled for efficient operation and to form effective complete grounded shielding means for encased circuit structure, while permitting ready replacement of parts.

A still further object of the invention is the provision in such a system of such cable structure which may have mounted on an end thereof, preferably co-axially, a transformer primary winding thereby forming a part of a cable subassembly and adapted to be readily inserted or socketed into a hollow transformer secondary structure when the cable is demountably attached thereto.

And another object is to provide in such a system a relatively simple, effective connector for conductors which efficiently excludes air adjacent a circuit connection to avoid difficulties due to altitude changes, assures secure seating of parts and automatic self-alignment thereof and an effective moisture-proof seal and gasketing to supporting structure, is economical of construction and easy to install and replace, and provides self-locking characteristics to avoid accidental demounting of parts or associated structure.

In addition, another object is to provide structural embodiments of the apparatus and parts thereof which are readily constructed, are adapted to economical mass production and allow efficient use and operation thereof in association with existing parts of other types of ignition systems, if desired, without necessitating major changes.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawing, in which.

Prior to the present invention it has been proposed to provide an ignition system for internal combustion engines which generates pulses of electrical energy, distributes these pulses toward the spark plugs of the various cylinders, then converts the energy to a high frequency current and finally transforms the relatively low voltage high frequency energy to high frequency energy at relatively high voltage for supply to the spark plug gaps to overcome firing difficulties caused by fouling of spark plug electrodes with carbon and oil. Such systems, however, have been far from satisfactory since the proposals have involved features of construction giving rise to excessive power losses resulting in weak ineffective sparks at the spark gaps and have been entirely inadequate for use with aircraft engines where conditions due to extreme and rapid changes in altitude and the dictates of that particular service give rise to a variety of ignition troubles. Further, such proposals have entirely ignored the serious problems of radio interference which is of extreme importance in that type of service. These and many other difficulties of the prior art and the problems of aircraft ignition are efficiently eliminated or satisfactorily minimized by the present invention which will become apparent as the various features thereof are hereinafter detailed.

Figure 1:
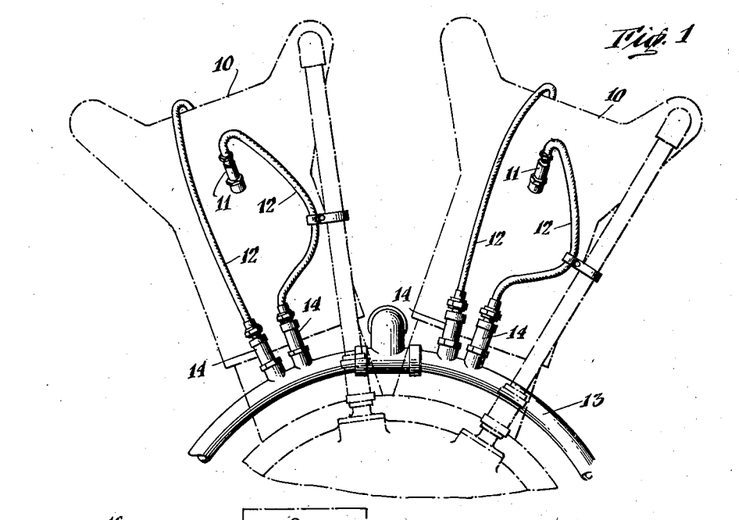
Fig. 1 is an elevational view, with parts broken away, of parts of an ignition harness incorporating features of the present invention, showing the relation thereof when in mounted positions to parts of a radial aircraft engine indicated in a fragmentary manner by dot-dash lines.

In the drawings like numerals identify like parts throughout and as indicated in Fig. 1 an embodiment of the apparatus of the present invention is incorporated in an ignition harness similar in many respects to those with which radial airplane engines are now equipped. In that figure adjacent cylinders are diagrammatically indicated at 10, 10 by dot-dash lines. Each cylinder is equipped for dual ignition and accordingly has mounted in side walls thereof spark plug units 11, 11 to which are connected supply cables 12, 12 each in turn being connected to an ignition manifold 13. The ignition manifold encases and shields a plurality of supply conductors each of which is anchored at and connected to a converter unit 14 mounted upon the manifold and in turn connected to one of the connecting cables 12.

Figures 2, 5, 9:
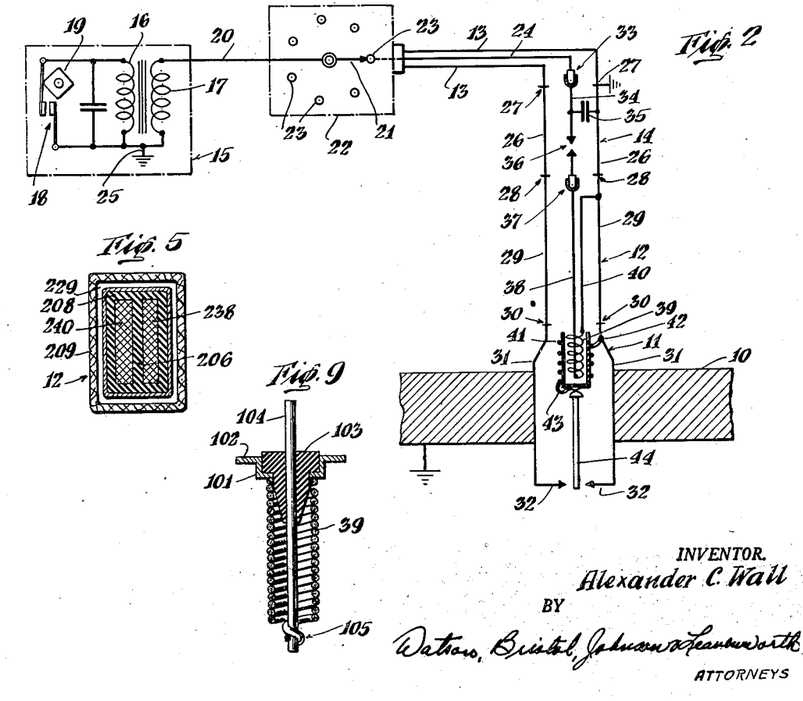
Fig. 2 is a diagrammatical showing of a typical ignition circuit in which apparatus of the present invention is employed.
Fig. 5 is a transverse sectional view of a modified form of the connecting cable of the present invention.
Fig. 9 is a longitudinal sectional view of a modified form of the transformer primary winding and associated supporting means adapted for mountation on one end of the connecting cable in substitution for the structure shown in Fig. 3.

In Fig. 2 is diagrammatically shown a typical circuit of such an ignition system in which apparatus and parts thereof of the present invention may be employed. It may comprise a source 15 or means for generating pulses of electrical energy such, for example, as a standard magneto which may comprise a primary coil 16, a secondary coil 17 and breaker mechanism 18 including an operating cam 19. One side of the secondary coil 17 of the magneto 15 may, as shown, be connected by a conductor 20 to a rotary element 21 of a distributor unit 22, which rotary element is adapted successively to cooperate with a plurality of fixed distributor terminals 23—23. Each of a plurality of conductors 24 is connected to one of the distributor terminals 23 to form one side of a supply circuit to a spark plug unit 11. The other side of the supply circuit is provided by means of a grounding connection 25 for the secondary coil 17, such as through the case of the magneto 15 to the engine frame, and the manifold 13 also grounded preferably to the engine frame. The converter unit 14 comprises a metallic casing 26 connected to the manifold 13 at 27 and grounded thereby with the metallic casing in turn connected at 28 to one end of a shielding sheath 29 of the cable 12. The other end of the shielding sheath 29 is connected at 30 to the shell or metallic casing 31 of the spark plug unit 11 which is grounded to the cylinder wall 10 and in a known manner carries one or more spark plug electrodes 32—32.

The supply conductor 24 is connected at 33, such as by means of a socket coupling, to a conductor 34 within the converter unit 14. A condenser 35 is bridged across between the conductor 34 and the metallic casing 26. The conductor 34 is also connected to one electrode of spark gap means 36 with the other electrode thereof connected to a circuit connector 37, which may also be a socket coupling. A cable conductor 38 is connected between the socket coupling 37 and one end of a transformer primary winding 39, the other end of the transformer primary winding being connected by another cable conductor 40 to the grounded side of the circuit, such as to the shielding sheath 29 preferably at or near the connection 28 between the converter metallic casing 26 and the cable sheath 29 as shown.

The spark plug unit 11 includes within the shell 31 thereof a transformer secondary winding 41 connected at one end to the shell, such as at 42, and at the other end to contact means 43 which makes electrical contact with a central spark plug electrode 44.

Figures 3, 4, 6:
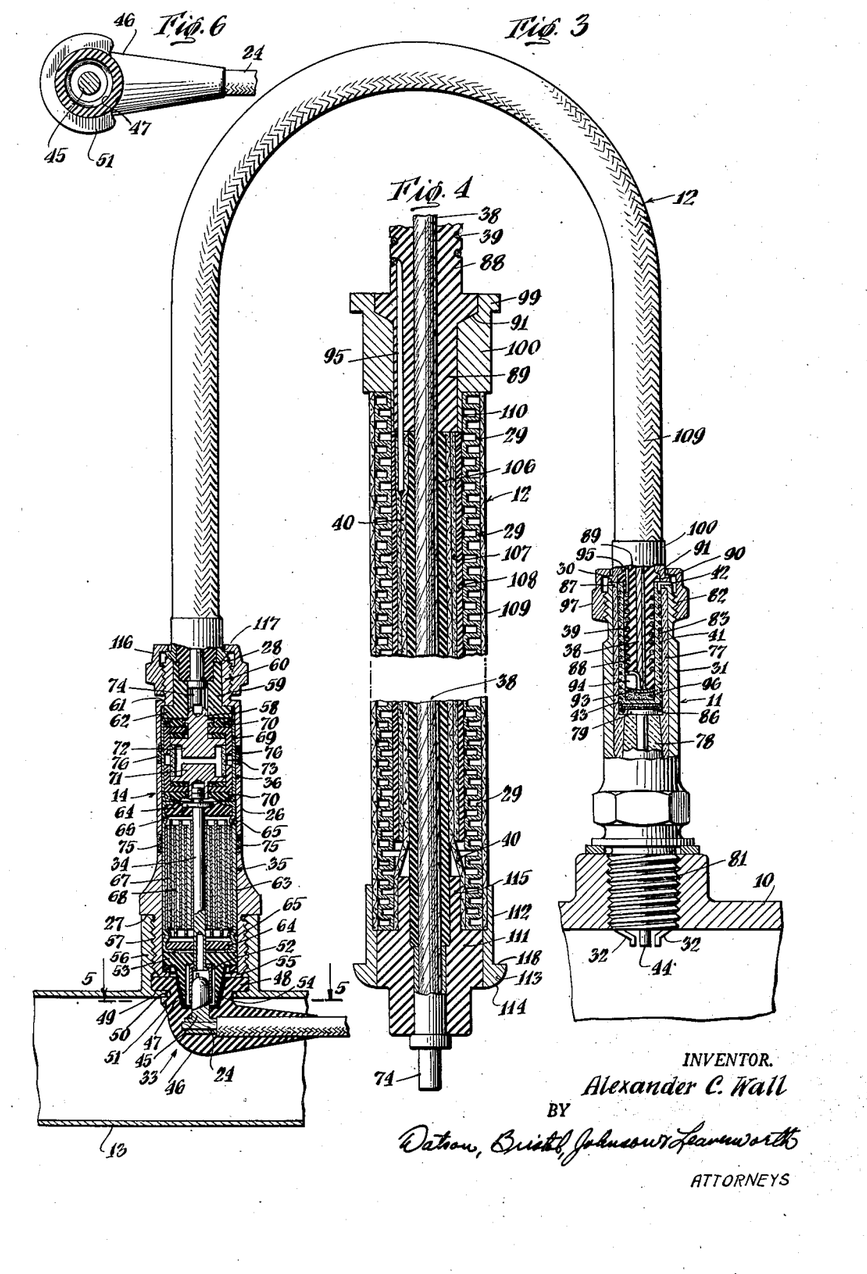
Fig. 3 is an enlarged elevational view, with parts broken away and in section, of portions of manifold and cylinder structures and assembled converter, transformer spark plug and connecting cable units associated therewith shown in Fig. 1.
Fig. 4 is an enlarged longitudinal sectional view, with parts broken away of the connecting cable unit shown in Fig. 3.
Fig. 6 is a sectional view taken on line 5—5 of Fig. 3 showing details of the conductor anchoring and connecting device adapted to use in the ignition manifold for connection of a supply conductor to a converter unit.

As shown in Figs. 3 and 6, the conductor 24 may comprise an insulated wire terminating at an electrical plug 45 connected thereto with the plug 45 extending substantially at right angles to the axis of the conductor. The electrical plug 45 and the end of the conductor 24 are preferably molded into a body 46 of resilient material, such as soft rubber, having a tapered recess 47 therein in which the end of the electrical plug 45 is bared or made accessible for connection to electrical circuit means. Circumambient of the tapered recess 47 is formed a circumferential flange 48 to provide a circumambient shoulder 49 for seating against rigid supporting structure. The latter may comprise a supporting flange formed by the wall of the manifold 13 circumambient of an aperture 50 therethrough. The resilient body 46 is loosely disposed in the aperture 50 and also is preferably provided with means spaced from the flange 48 to receive therebetween the supporting flange or wall of the manifold 13 at the aperture 50. This means preferably comprises another flange 51 which, as is more clearly shown in Fig. 6, preferably is interrupted to extend only partly about the recessed portion of the body 46 to permit more ready insertion through the aperture 50 in the manifold wall.

The socket coupling 33 comprises the plug terminal 45 and a cooperating socket 52 mounted in an accessible manner on one end of the converter unit 14. Preferably the tubular metallic casing 26 is closed at one end in a fluid-sealing manner by an element 53 of insulating material, such as laminated fiber or a molded plastic, which has a tapered or coned plug 54 shaped complementary to the tapered or coned recess 47 and projecting from the end of the casing beyond the edge 55 thereof. The plug 55 has a recess in which the socket 52 is seated and held in position by suitable anchoring means, such as the end of conductor 34 extending through the element 53 and spun over to engage and hold the socket as shown. The aperture 50 is preferably surrounded by an internally threaded metallic sleeve or neck 56 made integral with or brazed to the wall of manifold 13. External threads 57 on the end of the converter casing 26 are threadably engaged into the neck 56 to constitute an efficient grounding connection for the converter casing and means for ready demountable mounting thereof.

When the resilient body 46 is seated as shown, with flanges 51 and 48 disposed on opposite sides of the manifold supporting wall or flange thereof at the aperture 50 with the shoulder 49 seating against the outer surface of the manifold wall, and the converter unit 14 is screwed down into the neck 56, the resilient flange 48 gaskets the joint between the edge 55 of the casing 26 and the manifold wall. The coned plug 54 is, at the same time, forced down into the coned recess 47 tightly to engage the walls thereof further to assure a fluid-tight or moisture-proof seal and to eliminate any surrounding body of air subject to alteration as to insulating characteristics due to altitude changes. The connector resilient body 46, by virtue of its loose disposition in the aperture 50, its flexibility and the complementary tapered walls, is self-aligning with respect to the plug 54. There is a resultant secure seating of parts with the resilient gasketing and engagement of tapered walls assuring effective locking together of parts, such as the converter unit 14 with respect to the manifold 13, to avoid accidental loosening or demountation of the converter unit as a result of vibration due to engine operation.

The converter unit diagrammatically illustrated in Fig. 2, a structural embodiment of which is shown in Fig. 3, preferably includes the metallic elongated tubular casing 26 having two opposed terminals, one of which is accessible at one end of the casing and the other of which is accessible at the other end thereof for connection to circuit conductors. The socket 52 constitutes one of these terminals accessible to the plug terminal 45 of the supply conductor 24. The other opposed terminal preferably is a socket member 58 adapted to receive a terminal plug. The terminal member 58 is also mounted through an insulating element 59 which closes the other end of the tubular casing 26. The casing 26 is preferably reduced in section at 60 to provide internally an abutment shoulder 61 against which a flange 62 on the closing element 59 is seated, and the resulting necked portion 60 of the casing 26 is also externally threaded to provide for ready connection thereto of the connecting cable 12. Between the inner faces of the closing elements 53 and 59 are confined aligned condenser unit 35 and spark gap unit 36.

The condenser unit 35 preferably comprises a metallic or electrically conductive cylindrical casing 63 closed at the opposite ends thereof by discs 64, 64 of insulating material, preferably of soft rubber or other suitable resilient insulation, so that when the edges of the tubular casing are spun over to fix them in position beyond shoulders provided by beads 65, 65 the material of the insulating discs 64, 64 may bulge for sealing contact with adjacent structure. The closing discs 64, 64 preferably are centrally apertured to receive therethrough an axially arranged conductive post, serving as the conductor 34, with one end thereof spun over as shown in Fig. 3 to secure the socket terminal 52 within the recess of the insulating plug 54 and with the other end thereof provided with any suitable means such as an integral flange 66 to bear against the outer face of the other insulating disc 64. The condenser may be of the type described in Ruben Patent No. 2,266,809 of December 23, 1941, and may include a pair of foils 67 and 68 separated by insulating material and coiled about the through conductor or post 34 with the foil 67 electrically in contact therewith and the foil 68 electrically in contact with the metallic casing 63 so that the through post 34 forms one condenser terminal and the casing 63 forms the other condenser terminal. Electrical connection of the condenser casing 63 to the converter casing 26 to constitute a ground connection of the circuit may be had solely by face-to-face contact but, in view of a desirability to exclude air and gases from the converter casing exteriorly of the spark gap unit and the condenser unit with insulating material such as a sealing compound or insulating oil, electrical connection between the two casings 26 and 63 is preferably assured by a positive attachment as hereinafter described.

Figure 7:
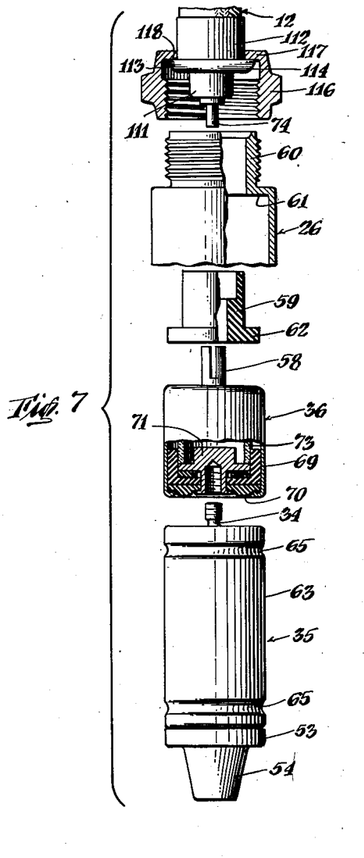
Fig. 7 is an exploded detail view, with parts broken away and in section, of an embodiment of the converter unit of the present invention, such as that shown in section in Fig. 3.

The spark gap unit 36, which is confined in the casing 26 between the plug element 59 and the inner end of the condenser unit 35, preferably is also cylindrical in shape and may be of a structure similar to that described in my copending application Patent No. 2,354,786, filed March 16, 1943. As shown in Figs. 3 and 7, the spark gap unit 36 comprises an outer tubular metallic casing 69 closed at opposite ends by discs 70, 70 of insulating material, such as resilient rubber, over the outer faces of which the ends of the casing 69 are spun, as shown, to confine therebetween the spark gap structure including a pair of opposed axially arranged gap electrodes 71 and 72 spaced a predetermined distance apart by any suitable means, such as a glass or ceramic sleeve 73. As a result the electrodes 71 and 72 are sealed in a fluid-tight manner within the spark gap casing 69 so as to assure substantially uniform operating characteristics under all conditions. The electrode 71 has a portion extending through one of the end discs 70 and is threadably engaged by an end of the through conductor or post 34. The other electrode 72 projects through the other end disc 70 and is preferably made integral with the coupler terminal 58 for electrical connection to a cable conductor, such as to a plug 74 on the end of conductor 38, to constitute the socket coupling 37.

It will be seen from an inspection of Fig. 3 that one end of the metallic casing 69 of the spark gap unit 36 is abutted against the inner face of plug element 59 and that the other end thereof abuts against an end of the metallic casing 63 of the condenser unit 35. In turn, the other end of the casing 63 of the condenser element 35 abuts against the inner face of the other plug element 53 to provide a solid mechanical construction and a rigid supporting core structure for the converter casing 26. The bulging of the resilient material from which the closure discs of the condenser and spark gap units may be formed also assures fluid-sealing circumambient of the axial conductors projecting from the opposed ends of the units, but it is to be understood that such interposed fluid-sealing may be attained by the employment of additional gasketing means such as interposed washers of resilient material. Further it is to be understood that such gasketing means may also be interposed between abutment shoulders on the plug elements 53 and 59 and internal abutment shoulders of the casing 26, as is suggested in Fig. 3 with respect to plug element 53. The term "abutting" is employed herein in its broadest sense, i. e., as including within the scope of its meaning both a possible actual face-to-face engagement of parts and a possible support of one part by another with an element such as a washer interposed therebetween which avoids actual face-to-face engagement of abutting parts while attaining a similar end.

As is more clearly indicated in the exploded view of Fig. 7, the various units or elements of the converter device 14 may be assembled by connecting the condenser and spark gap units 35 and 36 together by threaded engagement to provide a subassembly. The plug element 59 is placed in the tubular casing 26, with the flange 62 seating against the abutment shoulder 61, and the subassembly of units 35 and 36 is then slid into the casing 26 with the terminal connector 58 exposed through the plug element 59 in the neck 60 of casing 26. The so-aligned elements in the casing 26, having such end-to-end abutment of solid side walls, provides an effective foundation or backing support for encasing operations, such as the final step of spinning over the edge 55 of the converter casing 26, to form a rigid and solid mechanical construction while at the same time assuring fluid-sealing encasement of the enclosed parts. It has been found desirable to exclude air from the casing 26 when the parts are assembled therein by displacing air exteriorly of the condenser and spark gap units 35 and 36 with an insulating oil or other suitable sealing compound.

In order further to assure a rigid converter assembly and to provide an efficient electrical connection between the condenser terminal casing 63 and the converter casing 26, it is preferred, as a preliminary step, to provide the casing 26 with holes through the walls thereof. After assembly of the various units in the tubular casing 26 these holes are then filled or plugged with bodies of solder 75, 75 rigidly to attach the casings 63 and 26 together and to provide efficient electrical connection therebetween. This feature of rigidity may further be enhanced by providing similar holes through the casing 26 opposite the ultimate position of the spark gap unit 36 and similarly filling them with bodies or plugs 76, 76 of solder or the like for attachment to the spark gap casing 69. Thereafter the assembly is suitably filled with sealing compound such as insulating oil and the edge 55 of the casing 26 is spun over beyond a shoulder of the plug element 53. It is to be understood, however, that the casing 26 may be made of telescoping parts with end elements thereof previously provided with the abutting shoulders, such as 55 and 61. After assembly of the units therein with the parts telescoped as far as possible to provide a rigid construction the telescoped parts can then suitably be secured together, such as by soldering.

It will be seen that the resultant converter unit construction is characterized by an aligned assembly of the units within the casing with the condenser and spark gap means having a common terminal provided by the through post 34 and with the through post and condenser and converter casings constituting a part of a relatively low frequency supply circuit and also cooperating with the spark gap unit 36 to constitute a part of a high frequency circuit. The arrangement of parts avoids long devious paths for currents thereby minimizing power losses. The converter unit cooperates with the connecting cable and transformer primary structure hereinafter described to provide a high frequency circuit of excellent energy-conserving characteristics. This converter unit further is readily mountable to manifold structure in a simple but efficient fluid-sealing, electrically connecting and an effective shield-cooperating manner while being readily demountable for economical replacement.

Corona effect tends to occur in gaseous media adjacent elements carrying current at appreciable voltages or intervening as insulation between such elements and parts substantially at ground potential, particularly at high altitudes where rarefaction becomes appreciable, resulting in serious power losses attended by decreased efficiency. In accordance with the present invention this problem is taken into account in connection with both the converter unit and the transformer spark plug unit, but is more serious with respect to the latter due to the higher operating voltages. It is efficiently overcome by excluding air or other gases from the interior of these units by impregnation with insulating compounds. As to the transformer spark plug unit the relatively high operating temperatures must also be taken into account and only such insulating compounds as will effectively stand up under the rigid operating conditions should be employed. The entire transformer spark plug unit should be thoroughly saturated and impregnated with a suitable insulating compound such as a fluid polymerizing resin which will be transformed by heat into a heat-stable solid or semi-solid. Such material, if desired, may be filled with particles of refractory material such as ground glass, asbestos, mica, or the like. If the mechanical structure is such as to assure hermetic sealing of the parts within the encasing shell, such as that proposed in Fig. 11, a heat-stable or non-polymerizing fluid may be employed. It has been found that insulating fluids known in the industry as "Dow-Corning Compound 990-A Resin," and "200 Fluid" are satisfactory for the purpose of excluding air or other gases from those units.

Figure 8:
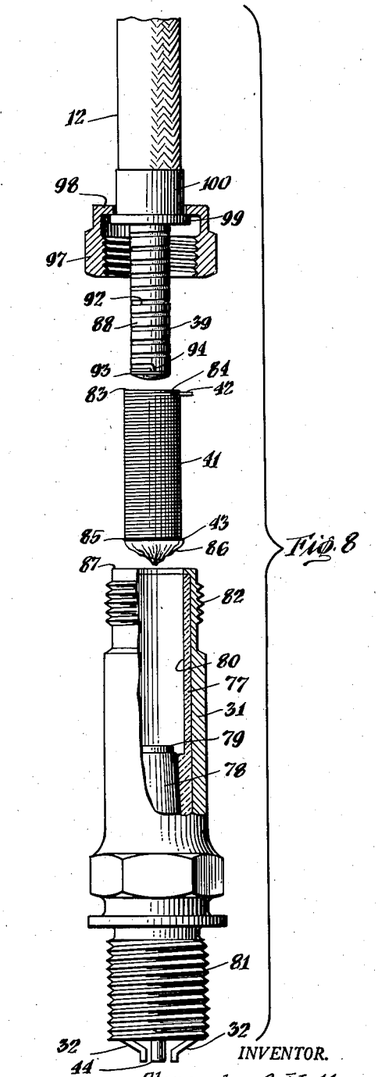
Fig. 8 is an exploded detail view, with parts broken away and in section, of an embodiment of the transformer spark plug unit and associated connecting cable of the present invention, such as that shown in section in Fig. 3.

The transformer spark plug 11 shown in Figs. 3 and 8 is partially of conventional construction. The spark plug, prior to adaptation to the ignition system of the present invention, may comprise a metallic casing or shell 31 lined with a sleeve 77 of suitable insulating material, such as a heat-stable ceramic or porcelain, which co-operates with an element 78 of similar material supporting the central electrode 44 and with a terminal button or head 79 on electrode 44 to provide a chamber 80 in the bottom of which the terminal 79 is exposed. In this conventional construction the chamber 80 is provided for reception of a circuit connector unit which, in accordance with the present invention, is replaced by a transformer structure. The metallic casing or shell 31 is provided at one end with external threads 81 threadably to be received in a hole in the wall 10 of an engine cylinder and at the other end with external threads 82 for demountable mounting thereto of a connecting cable such as that identified herein by the numeral 12.

The transformer secondary winding 41 is preferably wound about the exterior of a substantially cylindrical elongated cup or vial 83 of suitable insulating material, preferably glass, of a minimum wall thickness for separation of the primary winding 39 from the secondary winding 41 at a minimum distance. For efficient operation this distance between the primary and secondary windings must be quite small compared to the distance between the secondary winding and the metallic casing or shell 31 of the spark plug. The thin vial 83 preferably is made from Pyrex glass, but other glass materials such as lead glass may be employed provided thin layers thereof are of such character as to withstand the high temperatures and voltages to which they are subjected in operation of the system, in which average voltage stresses of the order of 2,000 to 3,000 volts per mil may be common and localized stresses may at times be as high as about 10,000 volts per mil.

The secondary winding 41 is arranged upon the glass cup 83 with the low tension end at 42 located adjacent the rim of the cup and the high tension end at 43 located adjacent the closed end or relatively flat bottom of the cup. Preferably the low tension end of the secondary winding 41 is anchored directly to the surface of the glass cup 83 adjacent the rim thereof by a body or smear 84 of metallic material, such as a silver compound which may be adhered to the glass by firing, preferably tinned with solder to anchor the wire. The high tension end of the winding 41 is preferably anchored in a similar manner to the relatively flat bottom of the cup 83 by means of another smear or body 85 of similar metallic material.

In accordance with one embodiment of the transformer secondary winding structure, a terminal is provided for the high tension end at 43 by soldering to the metallic smear or body 85 a piece 86 of metallic foil, such as tin foil, preferably initially in the shape of a disc of a diameter approximately twice as great as the diameter of the vial. After the disc 86 of tin foil and the high tension end of the winding 41 have been anchored at 43 in electrical connection by the metallic body 85 to the bottom of the vial 83 the disc of tin foil is coned or drawn out to a peak as shown in Fig. 8 so as readily to be receivable with the secondary winding into the chamber 80. When the secondary assembly is forced down into chamber 80 the foil cone 86 will be wadded against the electrode terminal 79 and adapt itself to the contour of the adjacent structure to assure good electrical connection and effective mechanical support. Although this means of electrically connecting the high tension end of the secondary winding 41 to the electrode terminal 79 is preferred, it is to be understood that other means may, if desired, be employed to accomplish a similar end. Such means may comprise a small helical spring compressed between the smear 85 of metallic material on the bottom of the vial to which the high tension end of the winding 41 is anchored and the electrode terminal 79, thereby providing effective electrical connection and a resilient mechanical support.

The transformer secondary assembly including the vial 83 and the secondary winding 41 may be removably mounted in the chamber 80 with a terminal or pigtail at 42 for the low tension end adapted to be held in contact with the edge 87 of the casing or shell 31 by connecting cable structure when a connector of or sleeve nut on the latter at 30 is engaged with threads 82. However, if desired, the transformer secondary assembly may be permanently mounted within the chamber 80 by a soldered connection between the terminal for the low tension end at 42 and the edge 87 of the casing 31, or by a body of solder bridging across between the spark plug casing or shell 31 and the anchorage smear 84, or by any other suitable anchoring means that may readily occur to one skilled in the art.

The primary winding 39 is supported and constructed in a manner to be received or socketed in the glass cup 83 with that winding spaced by the glass cup from the secondary winding 41 at a minimum distance. This primary winding construction may, as shown in Figs. 2 and 3, comprise a core 88 of suitable heat-stable insulating material, preferably in the form of an elongated substantially cylindrical sleeve as shown, having an axial bore receiving an end of the conductor 38, a base portion 89, a flange 90 providing a shoulder 91, and a helical groove 92 on the outward end thereof in which the wire of the primary winding 39 is received and seated. Any insulating materials which will withstand the high temperatures encountered at the spark plugs without giving off gases which would tend to cause corona effects during engine operation are suitable, such as inorganic materials, e. g., glass or Micalex; or other materials such as asbestos-filled Bakelite if subjected to a sufficient pre-baking period, e. g., about twenty-four hours at about 150° C.

The conductor 38 is anchored in the core 88 preferably by means of an end plate or washer 93 and solder which is employed also for the purpose of electrically connecting an end of the primary winding 39 thereto. For this purpose the end of the primary winding may be drawn through a slot 94 in one side of the end of the core 88 to the axial bore in which the conductor 38 is received and there soldered to the latter at the time the end plate or washer 93 is soldered thereto for anchorage. The other end 95 of the primary 39 may be threaded up through a longitudinally extending hole in the base portion 89 of the core 88 to serve as a terminal for connection to the conductor 40.

As previously pointed out, with the primary 39 socketed into the glass cup 83 to be magnetically coupled with the secondary 41, this transformer structure preferably is thoroughly saturated or impregnated with suitable insulating compound to avoid corona effect and attendant energy loss. A body of such impregnating compound is indicated at 96. The primary winding 39 is held in assembled position socketed within the secondary winding 41 with both windings located within the chamber 80 in the spark plug shell or casing 31, preferably by means of an internally threaded sleeve nut 97 threadably engaged with external threads 82. The sleeve nut 97 preferably has a flange 98 engaged behind a flange 99 on a sleeve or ferrule 100 positioned about the base portion 89 of the core 88 with an internal shoulder in the sleeve 100 bearing against the core shoulder 91. The outward edge of the sleeve 100 is thus held preferably in contact with the end edge 87 of the spark plug shell or casing 31 to clamp, if desired, the secondary terminal or pigtail at 42 therebetween and to make good electrical connection between the spark plug casing or shell and the sleeve 100 at 30.

The structural features of this transformer are well adapted to the rather rigid requirements of a mounting of the transformer in the relatively small space or chamber present in a spark plug of conventional design. This mounting effects an efficient shielding of the transformer and eliminates long leads between the transformer and spark plug electrodes whereby possibility of certain energy loss is avoided. The transformer assembly of a typical embodiment of the invention is in overall dimensions about one inch long and about three-eighths of an inch in diameter and has a turn-ratio of the order of 15 to 20:1 with the secondary winding having about 400 turns of fine wire, such as No. 40 or 42. When voltage stresses on the insulation separating the primary winding 39 from the secondary winding 41 run as high as 2,000 to 3,000 volts per mil and may in the case of localized stresses run possibly as high as 10,000 volts per mil, there is a serious possibility of flash-over between the primary winding, which is substantially at ground potential, and the high tension end at 43 of the secondary winding 41 if mere sleeve separating insulation is used. The employment of the closed-bottom glass cup 83 avoids any necessity of providing a long flash-over path, such as by extending any separating tube or sleeve far beyond the high tension end of the secondary winding. The relatively thin-walled glass cup or vial element of the transformer of the present invention effectively eliminates possibility of flash-over while assuring a structure of minimum dimensions that is capable of efficiently standing up under such high voltage stresses and the relatively high heat of engine operation without an undue separation of the two windings, thereby assuring maximum operational efficiency.

In Fig. 9 is shown an alternative construction which may be employed for the primary winding 39. This so-called "air-core" structure may comprise a cupped metallic member 101 having a peripheral flange 102 and a plug 103 of suitable insulating material molded into the cup 101 and extending through a hole in the bottom thereof, with an axially extending conductor or metallic rod 104 fixed therein. The primary winding 39 is mounted in position about the rod 104 with one end seated against and preferably soldered to the cup 101 and the other far end preferably twisted about and soldered to the rod 104 at 105. In mounting this structure on the end of the cable 12, preferably axially therewith, the flange 102 is connected in any suitable manner to the conductor 40 and the rod 104 is connected in any suitable manner to the conductor 38.

In the development of the present invention it was found that, owing to the many relatively fixed characteristics of component parts, such as the size of the impulse condenser 35 necessary to provide sufficient energy at the highest practical low tension voltages, the inductance of the spark plug transformer primary winding 39 should be low, i. e., of the order of 0.1 to 1.0 microhenries. For efficient operation of the system it is essential that the cable connecting the converter unit 14 to the transformer primary 39 have an inductance which is substantially less than the inductance of the transformer primary to prevent the cable inductance from absorbing a substantial portion of the condenser voltage. Normally in high frequency transmission lines it is desirable to have the capacitance of the line as low as possible. However, unexpectedly in connection with the development of the present invention the contrary was found to give best results. The cable 12 forming a part of the high frequency or oscillatory circuit has, for best efficiency, been designed so that the capacitance thereof is high and the inductance thereof is low.

As indicated in Figs. 3 and 4 the cable 12 may be of concentric construction in which the conductor 38 serves as a core conductor and the conductor 40 is in the nature of a concentric conductor suitably separated from core conductor 38 by insulating material 106 of minimum thickness. In this concentric cable construction, contrary to normal practice, it has been found that the best results are obtained when the ratio of the diameter of the core conductor 38 to the diameter of the concentric conductor 40 approaches 1 as closely as possible. The core conductor 38 is preferably made up of a very large number, e. g. approximately 100 strands of very fine copper wire such as No. 40, preferably double or triple twisted. Such core conductor forces radio frequency current to employ practically each small wire separately thus utilizing the metallic conducting material most efficiently with a minimization of skin effect.

In a preferred embodiment of this concentric cable construction a sleeve of rubber 106 about the core conductor 38 is employed to insulate the concentric conductor 40 therefrom. The latter preferably comprises copper braid and is overlaid with a covering of cotton 107 having a layer of rubber 108 arranged thereabout. The shielding sheath 29 preferably comprises a continuous metallic hose of bellows construction, as shown, to assure flexibility and this sheath in turn is preferably overlaid with one or more layers 109 of protective bronze braid. As shown in Fig. 4 the metallic sleeve or ferrule 100 is preferably reduced in section to receive over an end portion 110 thereof the shielding sheath or hose 29 and protective braid 109 for anchorage thereto by any suitable means, such as by solder to assure good electrical connection and a continuation of the shielding provided by the transformer shell or casing 31. In the lower portion of Fig. 4 is indicated anchorage of the other end of the core conductor 38 to the plug-in connector 74 with a support thereof by a plug 111 of suitable insulating material. The latter is fitted within a metallic sleeve 112 having a flange 113 providing a seating shoulder 114 for electrical contact at 28 with the reduced end portion 60 of the converter unit casing 26. The end of the concentric conductor 40 is flared radially by a neck 115 of the plug 111 to be brought into contact with the shielding sheath 29 and these, together with the protective sheath 109, are soldered to sleeve 112. The sleeve 112 will thus provide a ground connection in the vicinity of the converter unit 14 for the concentric conductor 40 when an internally threaded sleeve nut 116 is threadably engaged with the externally threaded portion 60 of the converter unit casing 26, since a flange 117 on the sleeve nut bears against a rear shoulder 118 of the sleeve flange 113 to force the shoulder 114 into contact with the end of the casing portion 60. The grounding of the concentric conductor 40 at or adjacent the converter unit 14, rather than near the transformer spark plug unit 11, is an important feature of this embodiment of the cable structure in that it assures a minimization of energy losses. The flow of radio frequency currents is confined substantially wholly within the shielding sheath, thus minimizing objectionable radio interference radiations. When, as is conventional, the shielding sheath is used as a return path for the flow of current, discontinuities, such as loose connectors, dirt, etc., cause large potential differences to be generated at the discontinuities with resultant radio noise. As contrasted therewith it has been found by tests on the system of the present invention that with the employment of the shielded ground return conductor adequate radio noise suppression is obtained, even though the connectors of the shielding sheath be loose and touching but lightly at the joints. This result is completely distinct from that obtainable with the conventional construction.

An alternative connecting cable construction is shown in Fig. 5 wherein the conductors 238 and 240 of the oscillatory circuit are shown to be in the form of a pair of parallel flat braids separated a minimum distance by suitable insulating material 206 and mutually covered by a layer of insulating material 208 received within a metallic hose 229 covered by protective braid 209. This cable construction is preferably made in the form of a rubber extrusion having two parallel rectangular holes to provide the separating insulation 206 and the surrounding insulation 208. The thickness of the separating insulation 206, as in the case of the separating insulating sleeve 106 in the concentric cable, is dictated by the safe voltage break-down characteristics of the insulating material. The two flat braid conductors 238 and 240, preferably formed of many strands of fine copper wire, are threaded through the two parallel rectangular holes in the rubber extrusion and this assembly is drawn into the rectangular shielding sheath or hose 229 to be employed as a connecting cable 12 in the system with, of course, the conductor 240 again grounded to the shielding sheath 229 at or adjacent the converter unit 14.

Figure 10:
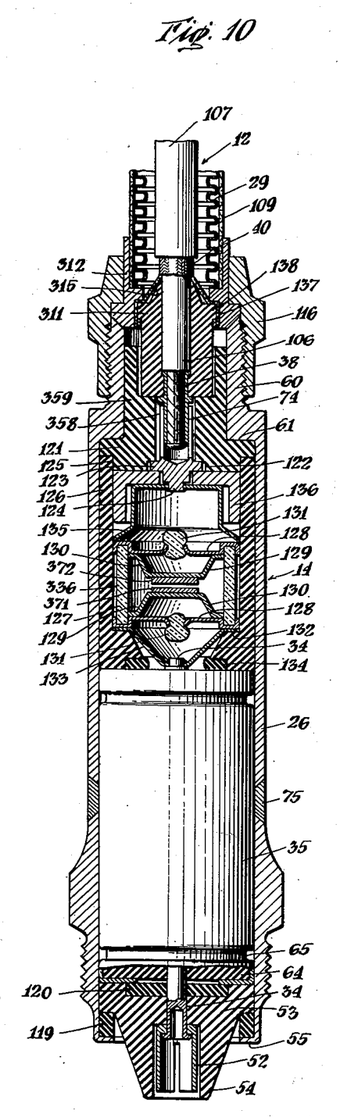
Fig. 10 is an enlarged longitudinal section, with parts broken away, of a modified form of the converter unit and connector cable attached thereto, adapted for employment in accordance with the present invention.

In Fig. 10 is shown a modified form of the converter unit 14 embodying the invention and a modification of connecting cable construction differing in some details, such as the connector structure, from the structure shown in Fig. 3. With respect to the converter unit the chief difference will be found in some of the gasketing for hermetic sealing and in adaptation thereof to a modified form of the spark gap unit.

As in the modification shown in Fig. 3, the casing 26 of the converter unit 14 shown in Fig. 10 is closed at one end by plug element 53 preferably with the employment of a gasket ring 119. The plug element 53 is similar to that shown in Fig. 3 except that it is recessed on its inner face for reception of a gasketing ring 120 to assure a tight seal for the end of the condenser unit 35. The other end of the casing 26 is closed by a plug 121 of insulating material which has a through bore and is provided with a socket in its outer end as is the plug 59 in Fig. 3. Plug 121, however, is provided with a socket 122 on its inner end for the reception and seating of a flange 123 on terminal socket member 358 and the latter, beyond the flange 123, is provided with a stud 124. The plug 121 is externally rabbeted at 125 to receive the edge of an encasing sleeve 126 and to form with the latter a chamber for reception of spark gap means 336.

The spark gap unit 336 comprises a glass envelope 127 preferably substantially cylindrical in shape with its opposed edges seated in circumferential grooves in end plates 128, 128 and there provided with a glass-to-metal seal. To the inner face of each end plate 128 is welded a bossed disc 129 with one carrying gap electrode 371 and the other carrying gap electrode 372. Each disc 129 is apertured such as at 130 so that the interior of the gap unit may be evacuated through apertures in the end plates 128, 128. After evacuation the apertures in end plates 128, 128 are plugged by any suitable means, such as bodies of molten glass 131, 131.

As shown in Fig. 10 the lower end of the sleeve 126 is internally provided with a shoulder 132 upon which is seated the edge of an end plate 128 of the gap unit 336 with the edge of a spring terminal member 133 interposed and clamped therebetween for good electrical contact when the parts of the converter unit are forced together and held in position by the spinning over of the edge at 55 of the casing 26. The spring contact 133 is centrally mounted on the extending stud end of the through terminal 34 of the condenser unit 35 as shown, and is preferably anchored thereto such as by soldering.

Preferably the lower end of the sleeve 126 is counterbored, as shown in Fig. 10, for the seating therein of a gasketing ring 134.

The other end plate 128 of the gap unit 335 is contacted by a spring terminal member 135 which centrally receives the stud 124 of the terminal socket 358. A centrally apertured cup 136 is preferably placed in the sleeve 126 over the spring terminal 135 to provide a sturdy and well-aligned assembly and with its central aperture traversed by the stud 124.

As shown in Fig. 10 the connecting cable 12 is generally similar to that proposed in Fig. 3. However, the sleeve 312, to which the shielding sheath 29 and the protective covering braid 109 are soldered, is counterbored at 137 for achorage therein of the flared end of the return concentric braided conductor 40 by anchoring plug 311 as the latter is forced into position with a flange 138 thereon seated in the socket provided by the counterbore 137.

Figure 11:
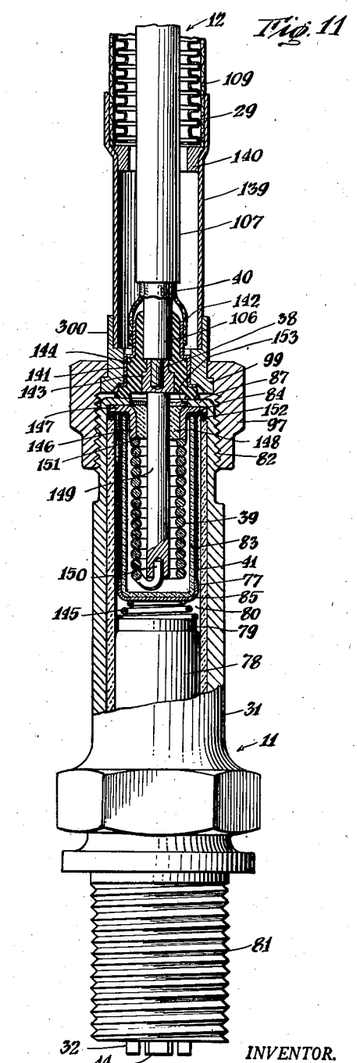
Fig. 11 is an enlarged elevational view, with parts in section and broken away, of a modified form of the transformer spark plug unit and associated cable connector of the present invention.

As shown in Fig. 11 the other end of the connecting cable may have its shielding sheath 29 and protective braid 109 received within the flared end of a metallic tube 139 against a stop ring 140 anchored therein. Obviously the tube 139 may be of any suitable shape and in actual practice may be turned to provide a gooseneck at the spark plug connector. The other end of the tube 139 is anchored within sleeve 300 which is provided with flange 99 for anchorage by means of the sleeve nut 97.

The sleeve 300 internally carries a flanged terminal sleeve 141 to which the concentric return conductor 40 is anchored, such as by soldering at 142. The exposed end of the core conductor 38 is provided with a terminal button 143 seated within a sleeve 144 of resilient material, such as relatively soft Neoprene, carried within the terminal sleeve 141. This structure permits disconnection of the cable at the spark plug unit without dismounting the primary transformer, and the resilient sleeve 144 permits a variation in the position of the cable end button 143 as the nut sleeve 97 is drawn up, so as to accommodate variations in the length of the terminal end of the medium tension lead of the primary transformer.

The spark plug transformer unit shown in Fig. 11 is similar to that shown in Fig. 3. However, the electrical connecting means between the electrode button 79 and the silver smear 85 on the glass cup 83 is in the form of a tapered helical spring 145 as previously proposed. The edge of the glass cup 83 is provided with a silver smear 84 as in the structure proposed in Fig. 3. The smear 84 is here employed in a soldered anchorage thereof to a flange 147 of a metallic sleeve 146.

The sleeve 146 supports, by means of any suitable insulating material at 148, a central medium tension lead comprising a metallic rod 149 having an end thereof extended beyond the sleeve 146 for contact with the terminal button 143, and with the other end thereof socketed for reception of the end 150 of the primary winding 39. The end 150 of the primary winding 39 is soldered to the terminal rod 149 and the other end of the primary winding is anchored at 151 to the supporting sleeve 146 in any suitable manner, such as also by soldering. The resultant structure constitutes a self-contained transformer unit which, during the assembly of the transformer spark plug unit, is put into the chamber 80 with the flange 147 resting upon a gasket ring 152 supported on the edge of the ceramic sleeve 77. Thereafter, during assembly of the parts, the edge 87 of the spark plug casing 31 is turned over beyond the flange 147 of the sleeve 146 to provide a rigid well-sealed, self-contained spark plug and transformer assembly. Preferably, to insure hermetic sealing of the parts within the transformer unit casing, a body of solder 153 may be run in to the position shown, sealing the joint between the flange 87 of the spark plug casing and the flange 147 of the supporting sleeve 146, and as a result such assembly makes possible the employment of fluid insulating compound for impregnating the interior of the spark plug transformer unit.

The resultant structure shown in Fig. 11 permits a disconnection of the connecting cable from the transformer spark plug unit, which may be desired in some cases, without necessitating a dismounting of any part of the transformer. It will be seen, however, that such structure provides a grounding of the concentric return conductor 40 at the transformer spark plug unit, a feature which is avoided by the structure proposed in Fig. 3. This may, in some cases, tend to increase radio noise to a small extent, but it has been found that the resultant construction of Fig. 11, when employed in the system proposed in the present application, is many times better, e. g., in many cases as much as 100 time better, than conventional systems from the standpoint of radio noise.

The operation of the device of the present invention will be more readily understood by reference to the circuit diagram shown in Fig. 1. The electrical power supply unit 15, such as a standard magneto, may deliver pulses of electrical energy at a peak voltage of about 1,000 to 1,500 volts through the distributor at proper timing successively to the various supply circuits 13—24, each of which includes, as a part of the converter unit 14, the condenser 35 which is thus charged. The condenser 35, spark gap 36 (also a part of the converter unit 14) and transformer primary winding 39 are connected in series by the connecting cable 12 to provide an oscillatory circuit in which, with a total impulse energy of about 7 millijoules, a high frequency current at, say, 1,000 volt peak and approximately 1 to 2 megacycles, will be caused to flow. With the employment of a transformer 39—41 having a turn-ratio of the order of 15 to 20:1 and a secondary winding of about 400 turns the peak voltage of the high frequency energy can be stepped up to in excess of 30,000 volts, possibly about 40,000 volts. As a result high frequency sparks are created at the gaps between the spark plug electrodes 44 and 32—32, which efficiently fire charges of fuel even though the spark plug electrodes be fouled with carbon and/or oil. Such typical operation has been attained by employment of structural embodiments of the present invention.

It will thus be seen that the objects set forth above, among others, are efficiently attained and since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In an ignition system for internal combustion engines, the combination comprising a converter for changing pulses of electrical current to high frequency electrical energy, a transformer spark plug for stepping up the voltage of said high frequency electrical energy to provide charge-ignition current of high voltage, and a connecting cable having a pair of conductors connected between said converter and the primary of the transformer, said cable having high capacitance and low inductance, said inductance being substantially less than that of said transformer primary.

2. In an ignition system for internal combustion engines, the combination comprising a converter including a condenser adapted to be charged by pulses of electrical energy and spark gap means having a pair of terminals one of which is connected to one of the terminals of the condenser, a transformer spark plug having a transformer primary winding and a secondary winding connected to the spark plug electrodes to supply high frequency charge-igniting current thereto, and a connecting cable having a pair of conductors connecting said transformer primary winding in series with said condenser and spark gap means to provide an oscillatory circuit for converting said pulses to electrical energy of high frequency, said cable having high capacitance and low inductance, said inductance being substantially less than that of said transformer primary winding.

3. In an ignition system for internal combustion engines, the combination comprising, a converter including a condenser adapted to be charged by pulses of electrical energy and spark gap means having a pair of terminals one of which is connected to one of the terminals of the condenser, a transformer spark plug having a transformer primary winding and a secondary winding connected to the spark plug electrodes to supply high frequency charge-igniting current thereto, and a connecting cable having a pair of conductors connecting said transformer primary winding in series with said condenser and spark gap means to provide an oscillatory circuit for converting said pulses to electrical energy of high frequency, and a grounded shielding sheath through which said conductors extend, said cable having high capacitance and low inductance, said inductance being substantially less than that of said transformer primary winding.

4. In an ignition system for internal combustion engines, the combination comprising a converter including a condenser adapted to be charged by pulses of electrical energy and spark gap means having a pair of terminals one of which is connected to one of the terminals of the condenser, a transformer spark plug having a transformer primary winding and a secondary winding connected to the spark plug electrodes to supply high frequency charge-igniting current thereto, and a connecting cable having a pair of conductors connecting said transformer primary winding in series with said condenser and spark gap means to provide an oscillatory circuit for converting said pulses to electrical energy of high frequency, and a grounded shielding sheath through which said conductors extend, said cable having high capacitance and low inductance, with the conductor connecting the other terminal of said condenser to one end of said primary winding being grounded to said sheath at said converter.

5. In an ignition system for internal combustion engines, the combination comprising a converter including a condenser adapted to be charged by pulses of electrical energy and spark gap means having a pair of terminals one of which is connected to one of the terminals of the condenser, a transformer spark plug having a transformer primary winding and a secondary winding connected to the spark plug electrodes to supply high frequency charge-igniting current thereto, and a connecting cable having a pair of conductors connecting said transformer primary winding in series with said condenser and spark gap means to provide an oscillatory circuit for converting said pulses to electrical energy of high frequency, each of said conductors being formed of interwoven strands of fine wire contacting each other throughout their length with said conductors being so arranged and positioned a minimum distance apart as to assure high capacitance and low inductance for said cable.

6. In an ignition system for internal combustion engines, the combination comprising a converter including a condenser adapted to be charged by pulses of electrical energy and spark gap means having a pair of terminals one of which is connected to one of the terminals of the condenser, a transformer spark plug having a transformer primary winding and a secondary winding connected to the spark plug electrodes to supply high frequency charge-igniting current thereto, and a connecting concentric cable having a pair of concentric cylindrical conductors connecting said transformer primary winding in series with said condenser and spark gap means to provide an oscillatory circuit for converting said pulses to electrical energy of high frequency, said concentric cable having high capacitance and low inductance, said inductance being substantially less than that of said transformer primary winding.

7. In an ignition system for internal combustion engines, the combination comprising a converter including a condenser adapted to be charged by pulses of electrical energy and spark gap means having a pair of terminals one of which is connected to one of the terminals of the condenser, a transformer spark plug having a transformer primary winding and a secondary winding connected to the spark plug electrodes to supply high frequency charge-igniting current thereto, and a connecting concentric cable having a pair of concentric conductors connecting said transformer primary winding in series with said condenser and spark gap means to provide an oscillatory circuit for converting said pulses to electrical energy of high frequency, the core conductor being formed of strands of intertwined fine wire contacting each other throughout their length with the outer surface thereof spaced a minimum distance from the inner wall of the outer concentric conductor by insulation just sufficiently thick to satisfy maximum breakdown requirements whereby the ratio of the diameters of said conductors is as near one as possible.

8. In an ignition system for internal combustion engines, the combination comprising a converter including a metallic casing to be mounted upon a manifold, a condenser and spark gap means mounted in said casing and having a common terminal adapted to make contact with an insulated supply conductor in the manifold, said condenser having its other terminal connected to said casing to be bridged across a supply circuit connected to the manifold and the supply conductor, a connecting cable of high capacitance and low inductance having a pair of conductors with one connected to said casing and the other connected to the other terminal of said spark gap means at one end of said cable, and a transformer primary winding mounted on the other end of said cable and connected across said conductors.

9. In an ignition system for internal combustion engines, the combination comprising a converter including a metallic casing to be mounted upon a manifold, a condenser and spark gap means mounted in said casing and having a common terminal adapted to make contact with an insulated supply conductor in the manifold, said condenser having its other terminal connected to said casing to be bridged across a supply circuit connected to the manifold and the supply conductor, a connecting cable of high capacitance and low inductance having a pair of conductors with one connected to said casing and the other connected to the other terminal of said spark gap means at one end of said cable, a shielding sheath through which said conductors extend connected to said casing, and a transformer primary winding mounted on the other end of said cable and connected across said conductors.

10. In an ignition system for internal combustion engines, the combination comprising a converter for changing pulses of electrical current to high frequency electrical energy, a transformer spark plug for stepping up the voltage of said high frequency electrical energy to provide charge-ignition current of high voltage, and a cable connected between the converter and the primary of the transformer, said cable comprising a pair of spaced conductors separated by insulating material of the minimum thickness necessary to insulate said conductors from each other whereby said cable has high capacitance and low inductance.

11. In an ignition system for internal combustion engines, the combination comprising a converter for changing pulses of electrical current to high frequency electrical energy, a transformer spark plug for stepping up the voltage of said high frequency electrical energy to provide charge-ignition current of high voltage, the primary winding of the transformer having an inductance of approximately 1.0 microhenry, and a cable connected between said converter and said transformer primary winding, said cable comprising a pair of spaced conductors separated by insulating material of the minimum thickness necessary to insulate said conductors from each other whereby the inductance of said cable is substantially less than the inductance of said primary winding.

ALEXANDER C. WALL.

REFERENCES CITED

The following references are of record in the file of this patent:

UNITED STATES PATENTS

| Number | Name | Date |
|---|---|---|
| 1,994,128 | Foust | Mar. 12, 1935 |
| 2,189,913 | McCarty | Feb. 13, 1940 |
| 2,222,498 | Bychinsky | Nov. 19, 1940 |
| 2,234,579 | Robertson | Mar. 11, 1941 |
| 2,236,316 | Helgason | Mar. 25, 1941 |
| 2,266,614 | Robinson | Dec. 16, 1941 |
| 2,280,855 | Rose | Apr. 28, 1942 |
| 2,392,171 | Marsh | Jan. 1, 1946 |
| 2,398,635 | Harkness | Apr. 16, 1946 |